United States Patent

[11] 3,538,937

[72] Inventors: Lothar Diessel;
Joachim Sonnberg, Hildesheim; Reinhard Heineke, Neuhof, Germany
[21] Appl No. 688,240
[22] Filed Dec. 5, 1967
[45] Patented Nov. 10, 1970
[73] Assignee Diessel GmbH & Co.
Hildesheim, Germany
a corporation of Germany
[32] Priority Dec. 10, 1966
[33] Germany
[31] D 51,781

[54] LIQUID TRANSFER APPARATUS
3 Claims, 3 Drawing Figs.
[52] U.S. Cl. .......................................... 137/195,
73/200, 137/394
[51] Int. Cl. ...................................................... G01f 1/00
[50] Field of Search............................................ 55/164,
170, 189, 270; 73/200; 137/173—176, 195, 394;
141/1, 94; 210/85, 188; 222/72

[56] References Cited
UNITED STATES PATENTS
| | | | |
|---|---|---|---|
| 1,631,454 | 6/1927 | Bambach et al. .............. | 55/170X |
| 2,693,196 | 11/1954 | Hundley ....................... | 222/72X |
| 2,703,190 | 3/1955 | Muller........................... | 137/195X |
| 2,998,057 | 8/1961 | Graham......................... | 55/170X |
| 3,036,738 | 5/1962 | Sonneberg..................... | 222/72X |

Primary Examiner—Fred C. Mattern, Jr.
Assistant Examiner—Edward J. Earls
Attorney—Hill, Sherman, Meroni, Gross & Simpson ABSTRACT: A system for unloading bulk liquids from a truck to a storage vessel and volumetrically measuring the quantity of liquid unloaded wherein a pump is used for speeding up the unloading process and means are provided for eliminating gas bubbles from the liquid in its passage from the truck to and through the volumetric measuring apparatus on its way to the storage vessel.

Patented Nov. 10, 1970  3,538,937

INVENTORS
LOTHAR DIESSEL
JOACHIM SONNBERG
REINHARD HEINEKE
BY
ATTORNEYS 3,538,937

LIQUID TRANSFER APPARATUS

BACKGROUND OF THE INVENTION

Tanker vehicles such as tank trucks and railroad tank cars are used for the transport of milk and other liquids in large bulk quantities. In order to quantitatively receive the milk at a receiving station from such tanker vehicles, receiving systems have been developed for measuring the quantities of milk unloaded. Such systems are of two principal types; namely, gravimetric measuring systems and volumetric measuring systems. In gravimetric measuring systems the milk must be unloaded from the tanker vehicle into a weighing vessel in which the entire quantity of milk is weighed and then transported to a receiving station. In contrast to such gravimetric measuring systems, the volumetric measuring system simply measures the volume of liquid passing through a pipeline from the tanker vehicle to the receiving station and this method of measurement has the advantage that with it, quantities can be continuously received while the liquid is being pumped from the tanker vehicle.

A volumetric system is known which operates by gravity and by which a volume-measuring device is attached to the outlet connection of a tanker vehicle via a pipeline with an air eliminator located in between. Since this involves a volume-measuring device which would otherwise also measure the volume of air bubbles which may be in the milk, an air eliminator must be arranged in front of the measuring device in order to avoid an adulteration of the measurement. A prerequisite for this type of system is that the storage tanks must be on a lower level than the outlet of the tanker vehicle and since the flow rate in the pipeline depends on the static difference in height between the level of the liquid within the tanker vehicle and that at the receiving station, a large difference in level is required to obtain a suitable emptying time.

Another known arrangement consists of an open balance tank (open to the atmosphere) which serves to eliminate air, a pump, a volume-measuring device, a check valve, and the corresponding pipelines from the tanker vehicle to the receiving station. With this system the milk runs into the balance tank by means of gravity and is sucked from that tank by the operation of a pump to and through the volume-measuring device and the check valve into the storage receptacle. The conveyance capacity of this system, like that of the just previously mentioned, is dependent on the available gradient between the level of the milk in the road tanker and outlet of the pipeline into the open balance tank.

With either of these types of systems, an increase of the conveyance capacity and thus a shortened tanker vehicle emptying time, is only possible by enlarging the diameter of the pipeline and/or the height of the gradient. These changes, however, are often only possible to a limited extent.

In order to increase the conveyance capacity of systems of this general type, especially in the case of the first system, one can sometimes arrange a pump in front of the air eliminator or balance tank for systems which measure foamless liquids. This arrangement, however, creates the danger, as in the case of milk and similar liquids and wherever there might be larger air enclosures, of the pump causing a fine-bubbled froth which cannot be eliminated fast enough by air eliminators of the usual construction. With this arrangement a volume measurement of the milk would be inaccurate because it would be measuring a foamed liquid.

SUMMARY

This invention is directed to a means and method for positively pumping liquid from the tanker vehicle to and through an air eliminator and thence through a volumetric measuring apparatus to a receiver. The air eliminator chamber is provided with a valved vent and a pump is provided in the line downstream from the air eliminator so that upon operation of the pump, a partial vacuum will be created within the air eliminator thereby effecting closure of the valved vent and creating increased flow of liquid from the tanker vehicle into the air eliminator.

The pump is operated through the control of a float-actuated switch so that when the level of liquid within the air eliminator has fallen below a predetermined point, the pump will be shut off, thereby insuring that the foam present within the air eliminator and air will not pass through the volumetric measuring apparatus.

These and other more specific objects of the invention will become apparent from time to time as the following specification proceeds and with reference to the accompanying drawings.

DESCRIPTION OF THE PREFERRED EMBODIMENT

Figure 1:
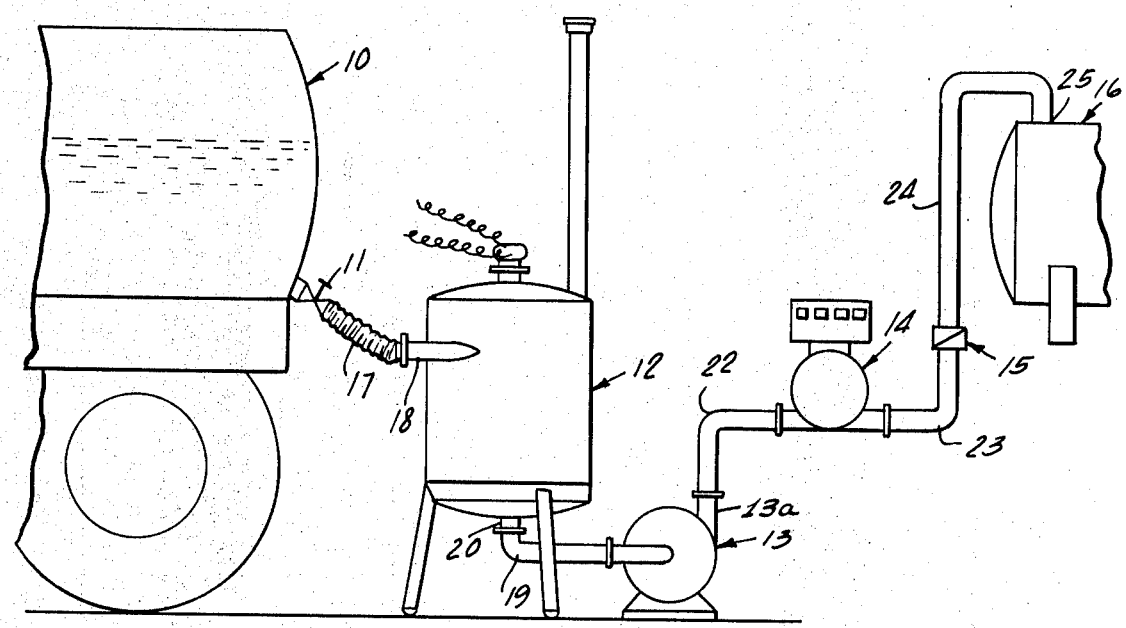
FIG. 1 illustrates diagrammatically in side elevation the principal components of the system.

Referring now to the drawings there is illustrated a tanker vehicle 10 having an outlet valve 11 opening from the bottom thereof, an air elimination tank 12, a pump 13, a volumetric measuring apparatus 14, a one-way check valve 15, and a receiving tank 16. A hose 17 leads from the outlet valve 11 of the tanker vehicle to an inlet fitting 18 adjacent the upper end of the air elimination tank 12 to dispense liquid from the bottom of the tanker to the interior of the air elimination chamber. A hose 19 leads from the outlet fitting 20 at the base of the air elimination unit to the inlet fitting of the pump 13 and other suitable hose 22, 23, 24 leads respectively from the outlet fitting 13a of the pump 13 and thence through the volumetric measuring apparatus 14, the check valve 15, and the inlet 25 of the receiving tank 16 in series.

Figure 2:
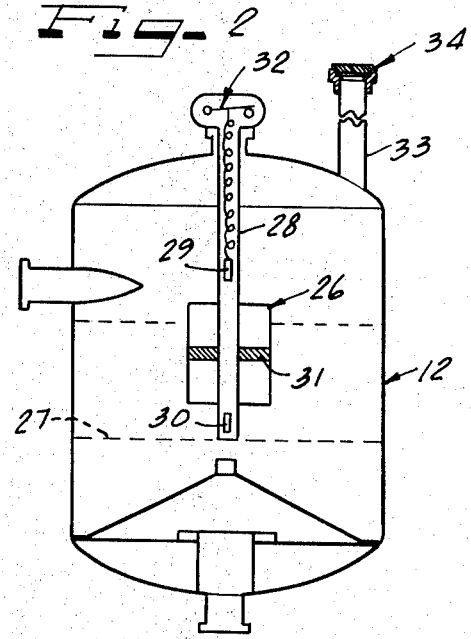
FIG. 2 illustrates one arrangement of the air eliminator tank.

A float switch 26 of a well-known type is provided in the air elimination chamber 12 to control operation of the motor for the pump 13. The float switch functions to keep the pump motor running as long as the liquid level within the air elimination chamber remains above some given point such as 27. As shown in FIG. 2, the float 26 is movable on a closed pipe 28 extending down into the interior of the air elimination chamber from the top and in the pipe are arranged upper and lower control elements 29 and 30, respectively, for switching the pump motor on and off.

As milk enters into the air elimination tank 12, the milk surface rises and with it the float 26. A very small quantity of milk is needed to fill the air eliminator 12, and in addition, this occurs at the start of the reception process when the road tanker is still full so that this takes only a short time. If the surface of the milk, and thus the float 26, reaches the height of the upper control element 29, the latter is set in motion by the ring magnet 31 within the float and the pump motor is automatically switched on by actuation of the pump motor control switch 32.

A vent stack 33 opens through the top wall of the air elimination tank 12 to the interior thereof and has an air check valve 34 fitting on the upper end thereof to permit air passage out of the air elimination tank to the atmosphere but to prevent a reverse flow of air.

The air displaced by the milk entering the air elimination chamber from the tanker vehicle escapes from this vent stack 33. When the pump 13 is turned on through movement of the float 26 and consequent actuation of the switch 32, a partial vacuum forms in the interior of the air elimination tank and in the pipeline 19 and in the hose connection 17 and the one-way ventilation valve 34 is thereby closed. The liquid sucked out of the tanker vehicle 10 through the air eliminator 12 is conveyed by the pump 13 via the pipeline 22 and via the volumetric measuring device 14 (which measures the volume of liquid flowing through it) a connection line 23, a one-way check valve 15, and a connecting conveyance line 24, into a storage receptacle 16. In this manner the liquid in the tanker vehicle is continuously pumped from the tanker and the volume of such liquid is continuously measured as it is pumped through the system. After the ventilation valve 34 has closed due to the creation of a negative gauge pressure or partial vacuum in the air separator 12, a closed or airtight system results so that not only gravity, but also the suction power of the pump 13 is relied upon to withdraw liquid from the tanker vehicle 10 to and through the conveyance system.

For ideal gases under constant temperature there exists a connection between pressure and volume according to the equation $P \times V =$ Constant. With sufficient accuracy air can be considered an ideal gas under the pressures and temperatures occurring in the system and, by the same token, if one considers that the specific heat of the milk is many times greater than that of the air, one can with sufficient accuracy consider the temperature of the air as constant. Since buoyancy is a function of volume, it increases with ideal gases in inverse proportion to the pressures to which it is subject. Since the air elimination chamber is under vacuum during operation of the pump 13, an enlargement of the volume of the air bubbles contained in it will be achieved whereby a better elimination of air from the liquid flowing through the system is made possible.

If the tanker vehicle 10 is empty, air passes through the suction hose 17 into the interior of the air elimination tank and since the outlet 20 from the tank is located at the base thereof, the pump 13 continues to suck milk out of the tank until the milk surface is lowered to about the level 27 and the float 26 has sunk so far that the lower control element 30 is set in motion by the ring magnet 31 to effect movement of the pump switch 32 to switch off the pump motor. The height of the lower control element 30 in the pipe remains constant meaning that the float 26 always switches the control element 30 at the same liquid level.

Figure 3:
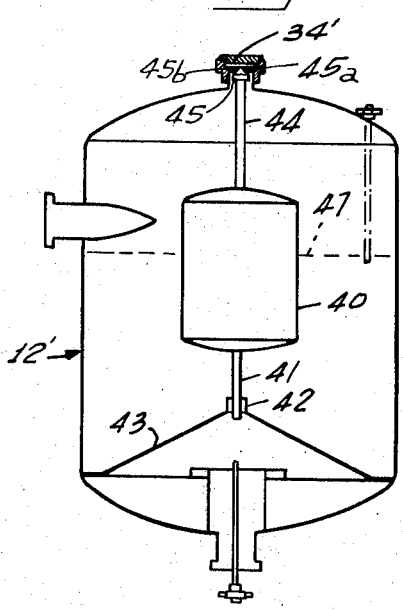
FIG. 3 illustrates a second arrangement of the air eliminator tank.

It is also contemplated by the present invention to provide an air separator 12', as illustrated in FIG. 3, having a float-controlled valve in addition to the one-way vent valve 34' and pump control means. The flow control valve prevents escape of liquid through the vent stack in the event the pump 13 fails to properly function while liquid gravitationally enters the air separator 12' from the tank 10. In most other respects the embodiment illustrated in FIG. 3 is identical to that described hereinabove and as illustrated in FIGS. 1 and 2.

A float 40 is positioned within the air elimination chamber and has a lower guide rod 41 slidably carried within a guide collar 42 which is connected via a base 43 with the side walls of the air elimination tank. The float 40 has an upper rod 44 which carries a valve head or cone 45 on its upper end and which valve cone is cooperable with an aperture 45a formed in a plate 45b to control the flow of fluid through aperture 45a. Opening and closing of the aperture 45a by the valve cone 45 is therefore controlled by the level of liquid within the tank. This arrangement insures that no milk will escape through the fitting in the top of the tank in which the plate 45b is situated in the event that through any defect in the electrical supply the motor is not switched on. In the FIG. 2 embodiment, a vent stack is, of course, provided which has a height higher than that of the liquid supply level as is shown in FIG. 1 so no liquid can escape through such stack.

In addition to the valving function provided by the valve cone 45 and aperture 45a, a single flappertype ventilation valve is provided which will freely open and close as the air pressure above the milk within the tank rises or falls, respectively, above and below atmospheric pressure. With the pump 13 operating, milk is continuously sucked out of the base of the air elimination tank and the float 40 begins to lower within the air elimination chamber causing the vent valve 34' to close. Upon operation of the pump and closure of the vent valve 34' a partial vacuum is created within the air elimination chamber and milk is drawn from the tanker vehicle through the hose 17. This process may continue for some time or (if the milk is drawn into the air elimination tank faster than the pump 13 can withdraw it) the liquid level may rise again to the level 47 at which time the float 40 will again move upwardly. As the liquid level rises, air will be vented through the open aperture 45a and past the flapper valve 46. Upon such venting, any flow of milk from the tanker vehicle into the air elimination tank is by gravity only since the vacuum condition within the tank is eliminated. When the liquid level has again returned to that illustrated in FIG. 3, the valve cone 45 will close the aperture 45a and venting of the tank will close.

Two valve arrangements are therefore provided in the fitting at the top of the tank. One is controlled by the level of liquid within the tank and the other by the pressure of air above the liquid within the tank.

These embodiments of this invention have been used for illustrative purposes only and it should be understood that various modifications and variations in the invention may be effected without departing from the spirit and scope of the novel concepts thereof.

We claim:

1. A pump-controlled liquid transfer system for conveying bulk liquids between a first container and a second container and for volumetrically measuring the quantity of liquid transferred, comprising:

an air separator tank having an inlet above a maximum liquid level normally maintained therewithin and receiving fluid from a first container, said separator having an outlet formed in a base thereof;

means forming a vent extending from an interior of said air separator and to the atmosphere;

a one-way valve formed in said vent for only permitting escape of air from said air separator tank;

a volumetric measuring apparatus;

electrically operated pump means having an inlet receiving fluid from said air separator outlet and an outlet directing fluid to said volumetric metering apparatus, said pump selectively drawing fluid through said air separator tank;

volumetric measuring apparatus;

electrically operated pump means having an inlet receiving fluid from said air separator outlet and an outlet directing fluid to said volumetric metering apparatus, said pump selectively drawing fluid through said air separator tank by developing a negative pressure therewithin to close said one-way valve in response to operation of said pump thereby applying a partial vacuum at said separator inlet for pumping liquid from said first container;

float-controlled switch means disposed within said air separator tank and controlling operation of said pump, said switch making a circuit to operate said pump whenever fluid within said air separator rises to a predetermined maximum level; and said switch breaking a circuit to stop operation of said pump whenever fluid in said air separator falls to a predetermined minimum level below the maximum level and above said air separator outlet.

2. A liquid transfer system as defined in claim 1 and further characterized by said means forming a vent having a port formed therein; float-controlled valve means closing said port when a predetermined maximum liquid level is reached within said air separator.

3. A liquid transfer system as defined in claim 1 and further characterized by: means forming a check valve downstream of said volumetric measuring apparatus and only permitting fluid flow from said volumetric measuring apparatus to a second container downstream thereof.